United States Patent [19]
Feezel et al.

[11] Patent Number: 5,267,263
[45] Date of Patent: Nov. 30, 1993

[54] METHOD AND APPARATUS FOR INTERFACING SYNCHRONOUS DATA DEVICES OVER AN ASYNCHRONOUS COMMUNICATIONS CHANNEL

[75] Inventors: Richard M. Feezel, Havana; Ira B. Margolis, Tallahassee, both of Fla.

[73] Assignee: CQ Computer Communications, Inc., Tallahassee, Fla.

[21] Appl. No.: 833,643

[22] Filed: Feb. 10, 1992

Related U.S. Application Data

[63] Continuation of Ser. No. 289,547, Dec. 23, 1988, abandoned, which is a continuation-in-part of Ser. No. 41,848, Apr. 23, 1987, abandoned.

[51] Int. Cl.⁵ .................. H04B 1/38; H04L 25/38
[52] U.S. Cl. ......................... 375/7; 375/117; 370/49
[58] Field of Search ............ 375/7, 8, 106, 110, 375/112, 113, 114, 117; 370/32, 47, 48, 49, 84, 91, 93, 94.1, 97, 99, 100.1, 110.1; 379/93, 97

[56] References Cited

U.S. PATENT DOCUMENTS

| | | | |
|---|---|---|---|
| 4,048,440 | 9/1977 | Peck et al. | 375/117 |
| 4,512,026 | 4/1985 | Vander Meiden | 370/48 |
| 4,569,062 | 2/1986 | Dellande et al. | 375/117 |
| 4,578,797 | 3/1986 | Satoh et al. | 370/84 |
| 4,586,189 | 4/1986 | Tyrrell | 375/117 |
| 4,635,275 | 1/1987 | Borg et al. | 375/8 |
| 4,700,358 | 10/1987 | Duncanson et al. | 375/8 |
| 4,715,044 | 12/1987 | Gartner | 375/117 |
| 4,718,082 | 1/1988 | Parker et al. | 375/8 |
| 4,756,010 | 7/1988 | Nelson et al. | 375/106 |
| 4,761,800 | 8/1988 | Lese et al. | 375/117 |
| 4,817,147 | 3/1989 | Gorniak et al. | 370/32 |

OTHER PUBLICATIONS

"Data Communications" by Robert Techo, Jul. 1980 pp. 19-39.

*Primary Examiner*—Benedict V. Safourek
*Assistant Examiner*—Alpus H. Hsu
*Attorney, Agent, or Firm*—Blakely, Sokoloff, Taylor & Zafman

[57] ABSTRACT

An interface circuit for interfacing data communications between two synchronous data terminals over an asynchronous communications channel is described. The interface circuit includes a transmit means and a receive means, both of which operate independently of communication protocols, break or idle codes, synchronization characters, and data frames. The transmit means receives synchronous bit data from a synchronous terminal converts it to an asynchronous character data stream, and asynchronously transmits it at the baud rate of the asynchronous communications channel. The receive means receives the asynchronous character data from the asynchronous communications channel converts the asynchronous character data into a synchronous bit stream and transmits the synchronous bit stream synchronously to the synchronous data terminal.

10 Claims, 6 Drawing Sheets

FIG_1

FIG_2

FIG_3

A BIT STREAM COMING OUT OF SYNCHRONOUS HOST INTERFACE:

01111110111111101111111001001011110000111110...

B BIT STREAM AS TRANSFORMED BY A/SYNCHRONIZER GOING TO ASYNCHRONOUS MODEM AND COMING OUT OF REMOTE ASYNCHRONOUS MODEM:

0011111101011111101111101001010010011110100001111101...

C BIT STREAM AS RECEIVED BY REMOTE A/SYNCHRONIZER (START AND STOP BITS REMOVED):

01111110  11111011  11101111  11110010  10111110  00011111  10...

D MESSAGE AS UNDERSTOOD BY SYNCHRONOUS REMOTE INTERFACE:

01111110111111101111111001001011110000111110...

FIG_4

FIG_5A

FIG_6

METHOD AND APPARATUS FOR INTERFACING SYNCHRONOUS DATA DEVICES OVER AN ASYNCHRONOUS COMMUNICATIONS CHANNEL

REFERENCE TO RELATED APPLICATION

This is a continuation of application Ser. No. 07/289,547, filed Dec. 23, 1988, now abandoned, which is a continuation in part of application Ser. No. 07/041,848, filed Apr. 23, 1987, now abandoned.

BACKGROUND OF THE INVENTION

This invention relates to a method and apparatus for providing access to mainframe system synchronous communications facilities via traditional asynchronous facilities while retaining the major advantages associated with synchronous facilities.

The widespread use and increasing acceptance of personal computers (PC) in both the home and office environments has created a need for communication with other computers. Personal computers are increasingly being used in businesses of all sizes to maintain data bases representing all aspects of the operation of these businesses. Personal computers are also being utilized to access large computerized data bases containing specialized information. Data transmitted over the communication links between the computerized data base and the personal computer is characterized as either synchronous or asynchronous. In a synchronous data transmission, character timing is based on synchronizing characters at the beginning of each message or block of data. In an asynchronous data transmission, each character is preceded by a start bit and followed by a stop bit to synchronize a receiver with a transmitter for receipt of each character.

In an asynchronous data communications link serial data is transmitted in a nonclocked fashion. The communications link is kept in a known state such as a mark idle which consists of a succession of binary 1's. After a character is sent, the data line returns to a mark idle waiting for the next character. The start and stop bits added to each character are used to establish character and bit synchronization for the receiver equipment. The asynchronous character varies in length from five to eight bits depending upon the code used and whether a parity bit is added.

In a synchronous data communications link serial data is transmitted in a clocked fashion to establish bit by bit synchronization. The idle mode for a synchronous data link is determined by the individual system and can be either mark idling or the repetitive transmission of a special character. Information is sent in blocks or frames which typically contain many characters. Preceding these blocks of information are one or more synchronization characters used to provide block or frame synchronization.

If a synchronous modem is used in synchronous transmission, the transmitting side of the modem supplies a clock to the data terminal equipment (DTE) to be used by it to synchronously transmit data. The receiver side of the modem supplies the required synchronous clock along with the data stream to the DTE.

Synchronous transmissions provides for increased efficiency of the communications channel because start and stop bits are eliminated for each character. Synchronous operation is desirable when the data stream is steady; asynchronous operation is appropriate when the data stream is irregular.

Asynchronous communication channel hardware is more prevalent and less expensive than synchronous hardware. In addition, over switched dial lines, the speed of asynchronous modems has caught up with that of synchronous modems and asynchronous modems also provide automatic dialing.

Communication between two asynchronous ports over an asynchronous communications channel and communication between two synchronous ports over a synchronous communications channel is well known in the art.

Figure 1:
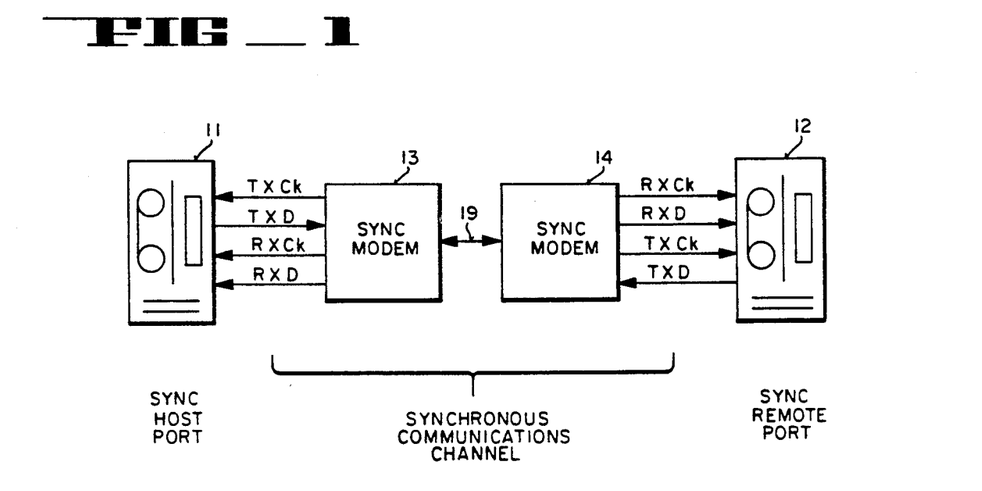
FIG. 1 is block diagram showing a typical synchronous data link.

FIG. 1 shows a typical Synchronous Data Communication System with two synchronous data ports communicating over a synchronous communications channel via a pair of synchronous modems. A brief description can be found in U.S. Pat. No. 4,569,062. That patent specifically teaches the concept of utilizing a synchronous communications channel with asynchronous data terminal equipment which requires 8 bit/byte and idle and break codes. However, there is a need for an inexpensive, reliable means of communications between synchronous data terminal equipment over an asynchronous communications channel without any regard to byte size, synchronization characters, synchronous communication protocols, break, or idle codes.

SUMMARY OF THE INVENTION

Accordingly, an object of the present invention is to provide an interface circuit for interfacing between any two synchronous data devices via asynchronous modems and to provide clocking signals to those synchronous devices. The interface circuit of the present invention provides for the conversion of the synchronous data stream so that it is compatible with asynchronous data modems. Briefly described, the interface circuit of the present invention includes a transmit means and a receive means, both of which operate independently of communication protocols, break or idle codes, synchronization characters, and data frames. The transmit means receives synchronous bit data from a synchronous data terminal, converts it into an asynchronous character data stream, and asynchronously transmits it at the baud rate of the asynchronous communications channel. The receive means receives the asynchronous character data from the asynchronous communications channel, converts the asynchronous character data into a synchronous bit stream, and transmits the synchronous bit stream synchronously to the synchronous data terminal is referred to as an A/Synchronizer. Its physical location in the computer communications network is illustrated in FIG. 2 (A/Sync in the Figure).

Figure 2:
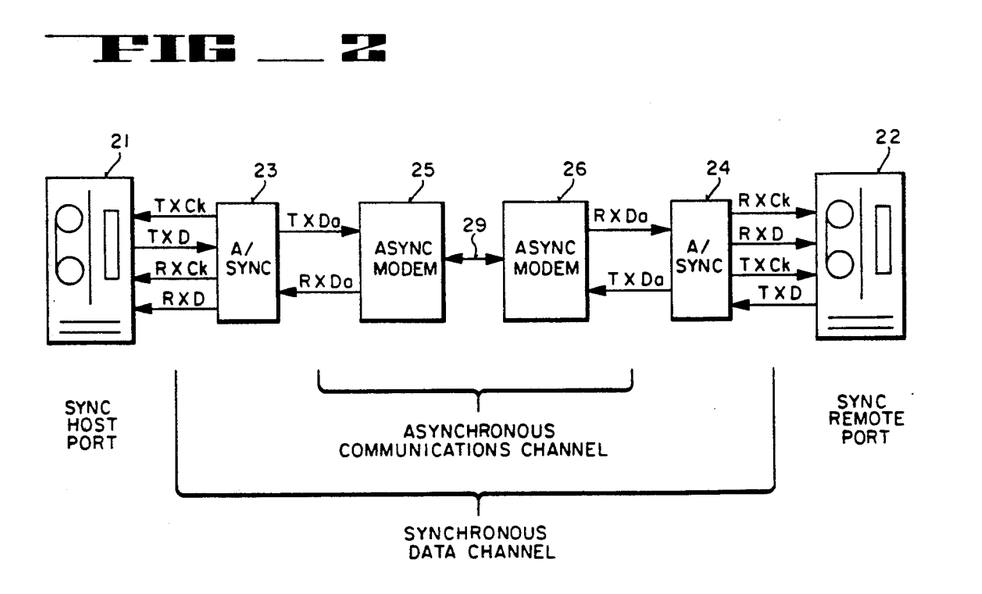
FIG. 2 is a block diagram showing the apparatus which implements the method of the present invention in an asynchronous data link environment.

Referring to FIG. 2, the outbound transmission from the mainframe host to the remote computer/terminal is accomplished by generating a transmit clock to the mainframe host and taking groups of eight transmission bits from the host interface, placing them between the start and stop character framing bits used for asynchronous transmission and feeding this modified data stream to a standard asynchronous modem. At the remote end of the telephone connection another standard asynchronous modem passes this modified data stream to another A/Synchronizer. This A/Synchronizer removes the start and stop bits leaving only the original eight data bits. It then generates a receive clock to feed the original 8 data bits to the remote synchronous terminal. Data transfer from the remote terminal to the mainframe host is accomplished in exactly the same fashion.

Since the bit streams which pass in and out of the mainframe interface are identical to those that result from the use of synchronous communications equipment and services, the same higher level protocol functions provided by the mainframe system are available to the remote user communicating with the mainframe site asynchronously but connected through an A/Synchronizer.

Figure 3:
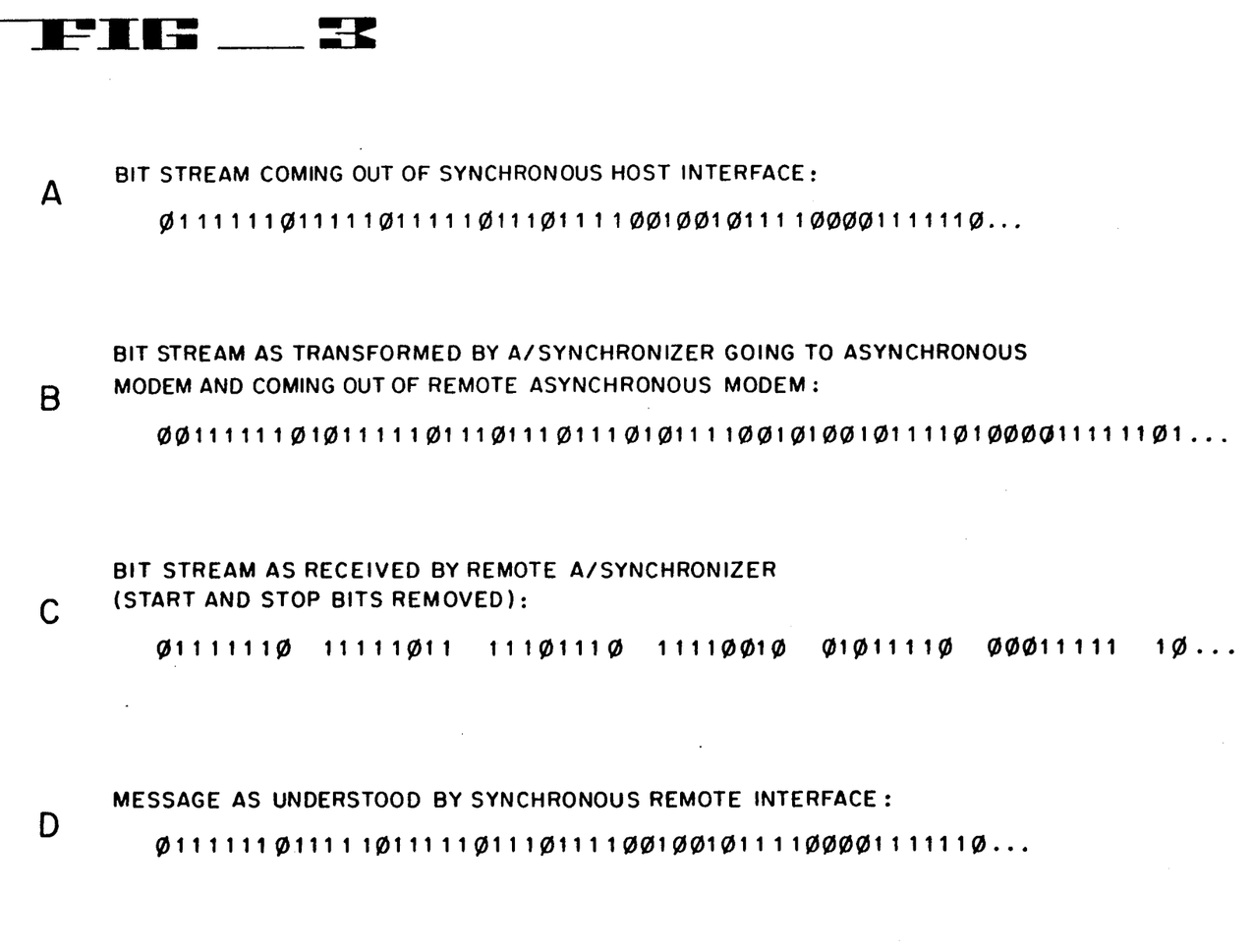

The transformations of the information bit stream described in the preceding paragraphs are depicted in FIG. 3. FIG. 3a shows the content of the message to be transmitted by the mainframe software in a typical transmission. The bit stream after transformation by the A/Synchronizer and going from asynchronous modem to remote asynchronous modem is shown in FIG. 3b. The bit stream received by the remote A/Synchronizer is shown in FIG. 3c with the start and stop bits removed. Finally, the message as understood by the remote synchronous terminal is shown in FIG. 3d.

BRIEF DESCRIPTION OF THE DRAWINGS

FIG. 3A-D is an illustration of the bit stream processing performed on transmitted messages using the method of the present invention.

DETAILED DESCRIPTION OF THE INVENTION

The apparatus which is used to carry out the method of the present invention is referred to hereinafter as an A/Synchronizer and is designed to be integrated into conventional asynchronous data link networks, without modification to either the asynchronous transmission line or any of the other communication devices in the link.

FIG. 2 shows in schematic form how the apparatus is integrated into a given asynchronous data link. In FIG. 2 a synchronous remote port 22 such as an IBM 3274 cluster controller, communicates with a synchronous host processing device 21 such as a mainframe computer over a transmission line 29 at standard asynchronous baud rates. The transmission line is a conventional telephone line supporting full duplex communication between the synchronous remote terminal and the synchronous host computer. Full duplex simply refers to a circuit used for transmission in both directions at the same time.

A pair of modulator/demodulator (modem) devices 25 and 26 are positioned on either end of an asynchronous transmission line 29. The modems modulate or demodulate the data applied to it depending upon whether the data is being transmitted or received respectively. The transmission line 29 may also consist of multiplexers to handle data to or from a series of remote terminals or encryption/decryption devices to code the transmitted data and decode the received data. These devices are designed to handle data information ocurring in asynchronous format.

The apparatus which implements the method of the present invention is referred to as an A/Synchronizer, as mentioned above. An A/Synchronizer 23 is installed between the asynchronous modem 25 and the synchronous processor 21, and another identical A/Synchronizer 24 between the asynchronous modem 26 and the synchronous processor 22. The A/Synchronizer 23 is capable of both transmitting and receiving asynchronous communications to/from the asynchronous modem and providing clocks for transmitting and receiving synchronous communications to/from the synchronous processor.

Figure 4:
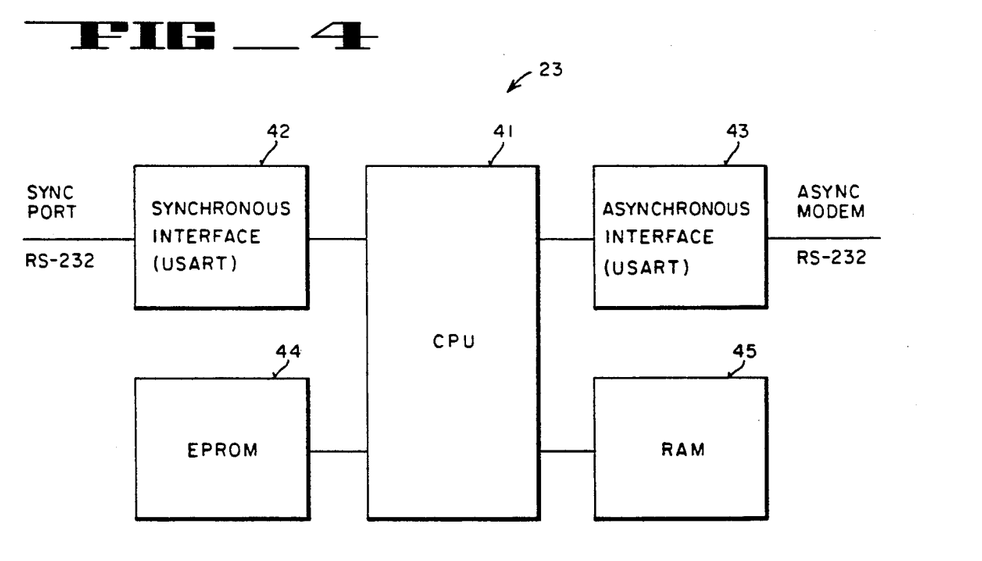
FIG. 4 is a block diagram showing the synchronous host and asynchronous remote interfaces in the apparatus which carries out the method of the present invention.
Figure 5A:
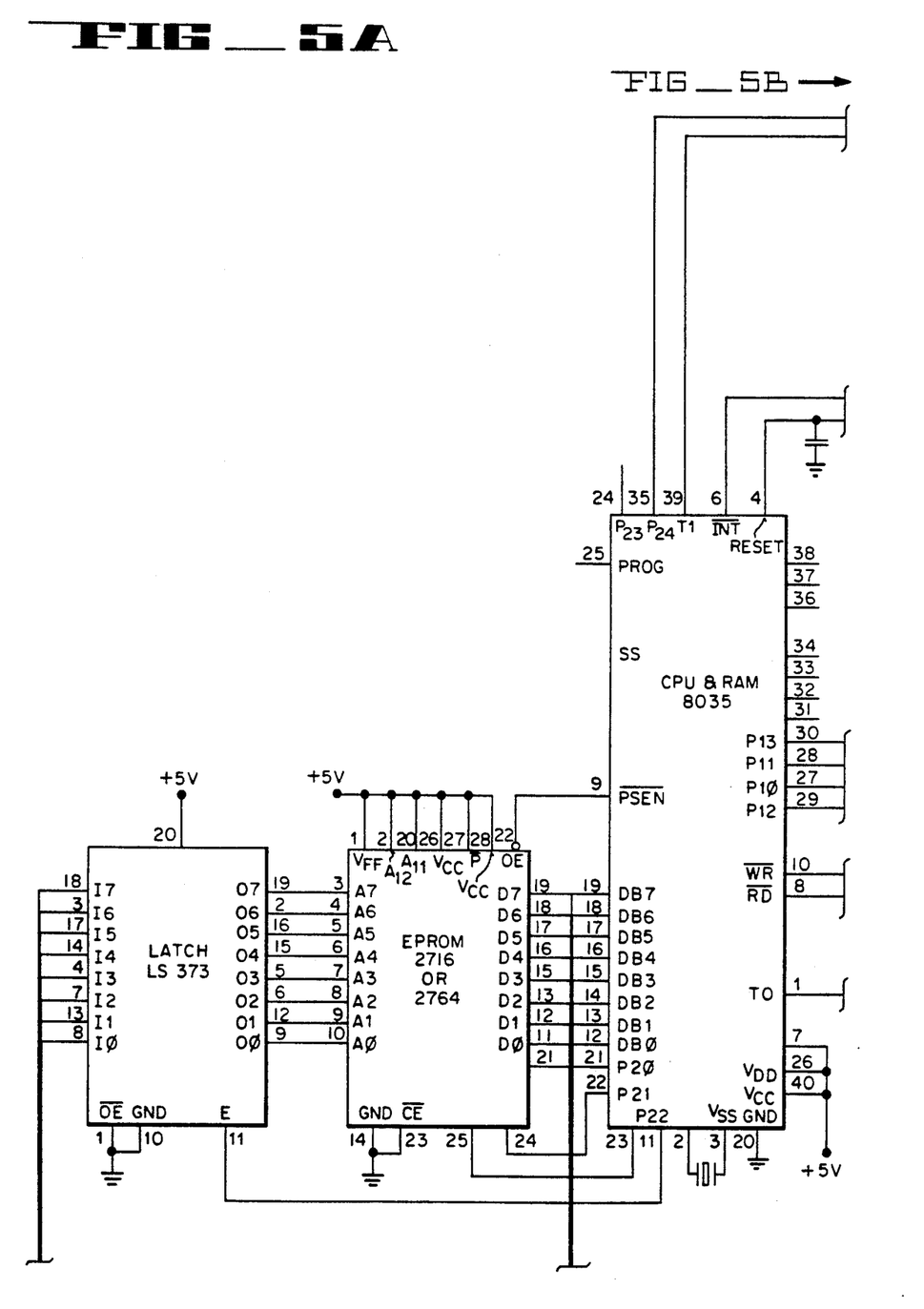
FIG. 5A and 5B are schematic block diagram of the hardware realization of the apparatus which carries out the method of the present invention.
Figure 5B:
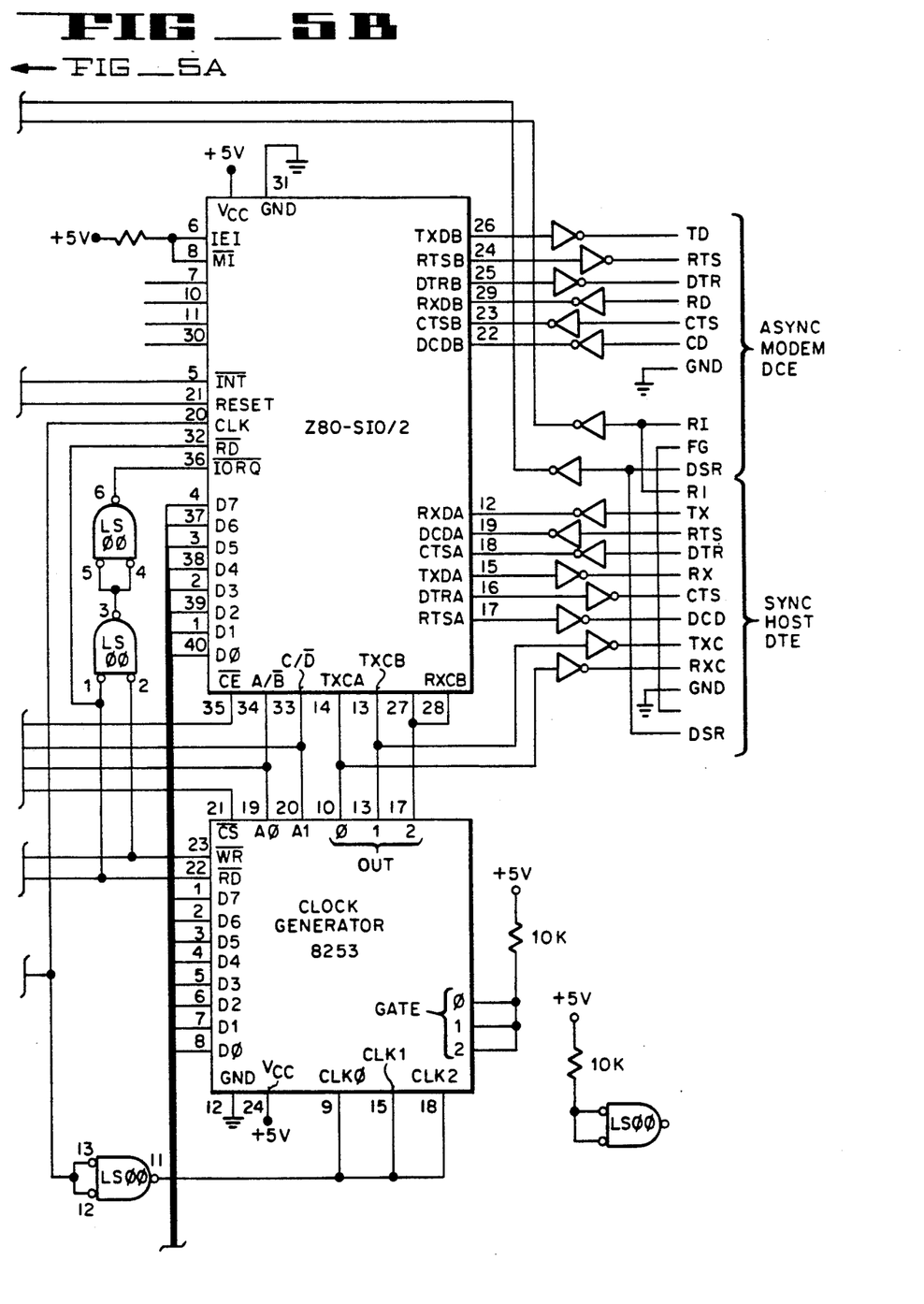

The synchronous interface 42 and the asynchronous interface 43 of A/Synchronizer 23 are illustrated in FIG. 4. The heart of the A/Synchronizer 23 is the CPU 41 which is an INTEL 8035 microprocessor in the embodiment illustrated in FIG. 5. The EPROM 44 contains the microprogram which handles the conversion between asynchronous and synchronous message formats. RAM 45 is used for dynamic buffering of data signals and loading of instructions from EPROM 44. An RS-232 interface is required between the asynchronous interface 43 and the asynchronous modem 25, and between the synchronous interface 42 and the synchronous port 21. A/Synchronizer 24 performs the identical interfaces between an asynchronous modem 26 and between synchronous remote port 22. These interface circuits convert TTL-level voltage signals to RS-232 voltage levels and back again. The preferred embodiment uses the Motorola MC1489 RS-232 receiver and the Motorola MC1488 RS-232 driver.

In the embodiment, the Universal Synchronous Asynchronous Receiver/Transmitter (USART) is the Z80-SIO and the clock generator is the INTEL 8253. The USART integrated circuit devices perform serial to parallel bit conversion in transferring the data stream to RAM eight bits at a time. The USART performs parallel to serial bit conversion in data transfer from RAM to the asynchronous modem or to the synchronous port.

The information presented to the asynchronous modem from the asynchronous interface 43 consists of groups of 8 transmission bits from the synchronous interface 42 to which start and stop framing bits have been added by the interface. The data stream is transmitted across the telephone connection to another standard asynchronous modem which in turn passes the data stream to the asynchronous interface of a second A/Synchronizer.

The information presented to the asynchronous interface 43 from the asynchronous modem is in conventional asynchronous coded format, comprising a series of 10 bit characters delimited by a start and stop bit. Between these delimiting bits are 8 data bits. The interface 43 removes the start and stop bits and passes the remaining 8 information bits on to the CPU 41. The CPU uses a small amount of RAM as a first in, first out (FIFO) buffer for the data. This data is then passed to the synchronous host interface 42. The bit stream and clock signals are passed from the host interface 42 to the host processor 21 where these signals are interpreted in the same way that they would have been had the transmission been from a synchronous modem.

Figure 6:
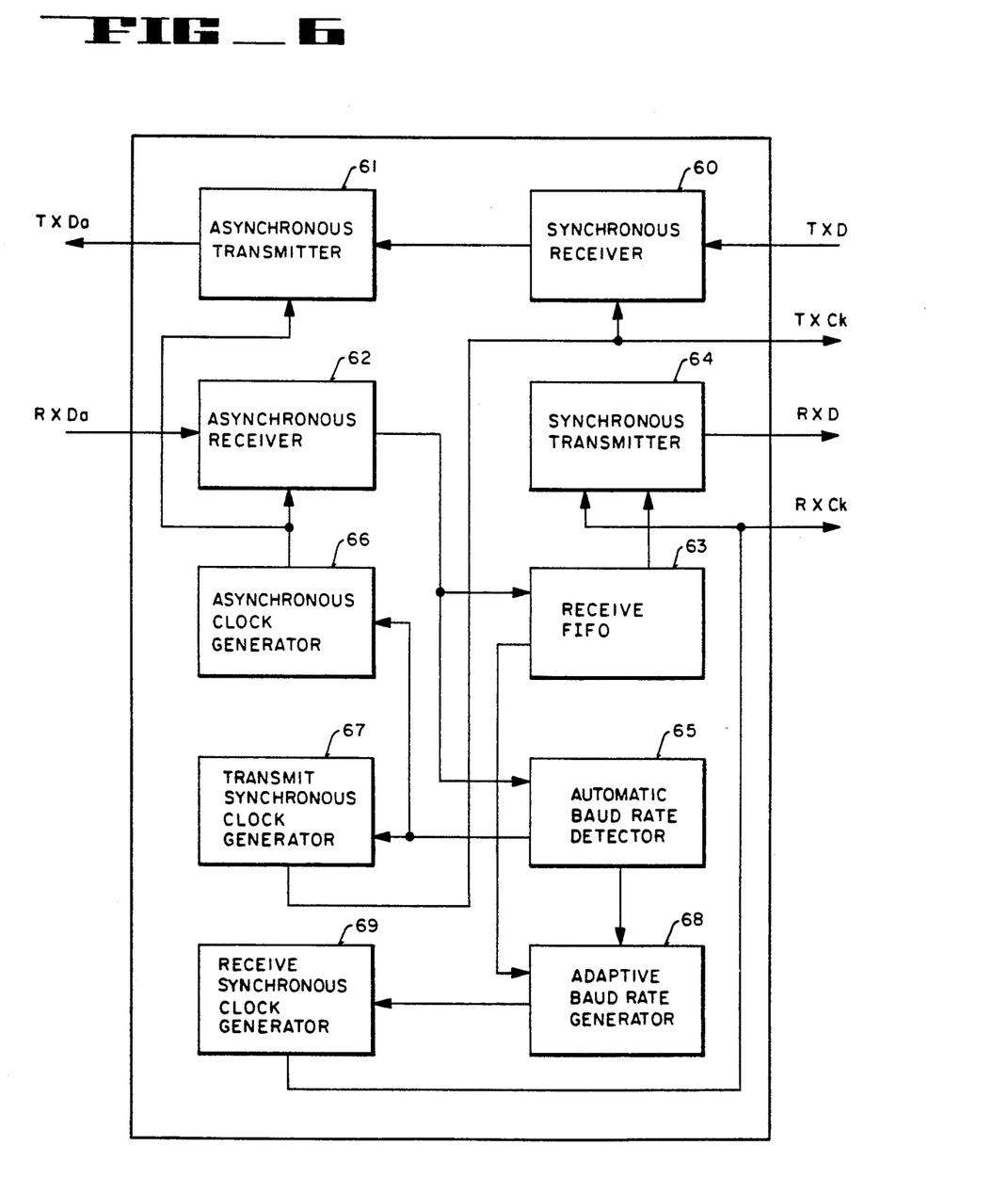
FIG. 6 is a block diagram showing the flow of data information and data clocking within the interface of the apparatus.

Referring to FIG. 6, the synchronous receiver 60 is programmed to receive 8 bits of synchronous data, TxD, at a time from the synchronous port. This 8 bit blocking of synchronous data is independent of any byte boundaries, byte size, synchronization characters, format of the synchronous data, or any protocols involved with the synchronous data stream.

Each 8-bit character is transmitted via the asynchronous transmitter 61, which is programmed to transmit 8 bit characters and automatically append a start and a stop bit, to an asynchronous modem.

Since for every 8 bits in the synchronous stream TxD, a start and stop bit must be inserted for asynchronous transmission, TxDa, the transmit synchronous clock generator 67 (TxCk) is set to 80% of the async baud rate determined by the automatic baud rate detector 65. In this way, the host sync port is precisely clocked to continuously send data without having to be buffered through the asynchronous transmitter and the asynchronous communication channel is kept saturated.

Receiving the asynchronous data, RxDa, and sending it to the synchronous port is handled a little differently since the actual bit rate of the received asynchronous data may differ from the baud rate of the asynchronous modem by as much as 5%. Therefore, if the synchronous receive clock was fixed at 80% of the asynchronous baud rate, asynchronous characters could still come in faster than they could be sent out synchronously, or the asynchronous receiver could be too slow, leaving bit times with nothing to transmit synchronously.

To solve this problem the CPU is programmed to perform adaptive baud rate generation 68. The asynchronous receiver 62 first sends the characters to a small (16 characters in the hardware realization) first in, first out (FIFO) buffer 63. These characters are then sent to the synchronous transmitter 64 at a bit rate determined by the number of characters in the FIFO 63. If the FIFO has 1 or 2 characters in it, the receive synchronous clock generator 69 is set to 70% of the asynchronous baud rate. Since the asynchronous communication channel is kept saturated by the A/Synchronizer on the other end, asynchronous characters will be received faster than the synchronous characters can be transmitted. Therefore the receive FIFO 63 will be filling up. If the FIFO ever gets 1 character away from being full, the receive synchronous clock generator 69 is set to 90% of the asynchronous baud rate. This forces the synchronous characters out of the synchronous transmitter 64 faster than the asynchronous receiver 62 is supplying characters to the FIFO 63, thus emptying the FIFO. This varying of the receive synchronous clock generator baud rate RxCk to rates between 70% and 90% of the asynchronous baud rate, provides a method of negative feedback which stabilizes the FIFO 63 at approximately three quarters full.

Hence, a method has been described which provides a capability for implementing a technique for interfacing between synchronous devices using conventional asynchronous communications facilities. The apparatus used is transparent to the synchronous remote computer 22, the synchronous host processor 21, and the transmission line equipment 29, 25, 26, and requires no modification of existing equipment or transmission lines.

Although an exemplary embodiment of the invention has been disclosed herein for purposes of illustration, it will be understood that various changes, modifications, and substitutions may be incorporated in such embodiment without departing from the scope of the invention as defined in the following claims.

In particular, a very common synchronous communication system has an IBM cluster controller as the synchronous remote port 22. With the boom in the personal computer market, these devices are rapidly being replaced by personal computers which can emulate them with appropriate software. Software can also be written for the personal computer to emulate the remote A/Synchronizer using the personal computer's built-in asynchronous serial port for a further reduction in cost. Thus a personal computer can emulate both the remote A/Synchronizer 24 and synchronous remote port 22.

What is claimed is:

1. In a communication system having first and second synchronous data terminals coupled via an asynchronous communications channel, the asynchronous communications channel having a channel baud rate, an interface circuit for interfacing between the asynchronous communications channel and the first synchronous data terminal, comprising:

a transmit means for transmitting an outgoing asynchronous character data stream having a first data format to the asynchronous communications channel upon receipt of a first synchronous bit data stream from the first synchronous data terminal, said transmit means converting the first synchronous bit data stream to form the outgoing asynchronous character data stream; and a receive means for asynchronously receiving an incoming asynchronous character data stream from the asynchronous communications channel, wherein the incoming asynchronous character data stream has the first data format, said receive means converting the incoming asynchronous character data stream to form a second synchronous bit data stream and synchronously providing said second synchronous bit data stream to the first synchronous data terminal.

2. The communication system of claim 1 wherein the transmit means comprises:

a synchronous receiver means for receiving the first synchronous bit data stream from the first synchronous data terminal, said synchronous receiver means converting the first synchronous bit data stream into the first data format and forming the outgoing asynchronous character data;

an asynchronous transmitter means for asynchronously transmitting the outgoing asynchronous character data stream to the asynchronous communications channel; and a first control means coupled to the synchronous receiver means, and the asynchronous transmitter means for controlling the asynchronous transmission of the outgoing asynchronous character data stream.

3. The communication system of claim 2 wherein the first control means further comprises:

a synchronous transmit clock means coupled to the synchronous receiver means to control the rate of clocking of the first synchronous bit data stream at a fixed rate relative to the baud rate of the asynchronous communications channel.

4. The communication system of claim 3 wherein the synchronous transmit clock means rate of clocking is set to 80% of the baud rate of the asynchronous communication channel.

5. The communication system of claim 1 wherein the receive means comprises:
an asynchronous receiver means for receiving the incoming asynchronous character data stream over the asynchronous communications channel, said asynchronous receiver means converting the incoming asynchronous character data stream to form the second synchronous bit data stream;
a receive data buffering means for temporarily holding the second synchronous bit data stream;
a synchronous transmitter means for synchronously transmitting the second synchronous bit data stream held in the receive data buffering means to the first synchronous data terminal; and
second control means coupled to the asynchronous receiver means, the receive data buffering means, and the synchronous transmitter means for controlling the synchronous transmission of the second synchronous bit data stream to the first synchronous data terminal.

6. The communication system of claim 5 wherein the receive data buffering means comprises a first-in, first-out queue in random access memory.

7. The communication system of claim 5 wherein the second control means further comprises:
an adaptive clocking means coupled to the receive data buffering means and the synchronous transmitter means to vary adaptively the rate of clocking of the second synchronous bit data stream to the first synchronous data terminal.

8. The communication system of claim 9 wherein the adaptive clocking means rate of clocking varies between 70% and 90% of the baud rate of the asynchronous communications channel.

9. In a communication system having a first synchronous data terminal and a second synchronous data terminal coupled via an asynchronous communications channel, an interface circuit for interfacing between the first synchronous data terminal and the asynchronous communications channel, the interface circuit comprising:
a transmit means which provides clocking for receiving synchronous data bits representing transmit data from the first synchronous data terminal, said transmit means transmitting the transmit data as asynchronous characters over the asynchronous communications channel; and
a receive means for receiving asynchronous data characters representing receive data from the asynchronous communications channel, said receive means providing clocking for transmitting the receive data synchronously to the first synchronous data terminal.

10. In a communication system having a first synchronous data terminal and a second synchronous data terminal coupled via an asynchronous communications channel, a method for interfacing synchronous bit data streams from the first synchronous data terminal over the asynchronous communications channel operating at a baud rate, the method comprising the steps of:
providing the first synchronous data terminal with a synchronous transmit clock to clock a first synchronous bit data stream transmitted by said first synchronous data terminal;
converting said synchronous bit data stream to an outgoing asynchronous character data stream;
transmitting the outgoing asynchronous character data stream over the asynchronous communications channel at the baud rate of said asynchronous communications channel;
receiving an incoming asynchronous character data stream over the asynchronous communications channel at the baud rate of said asynchronous communications channel;
converting the received incoming asynchronous character data stream to a second synchronous bit data stream; and
providing said first synchronous data terminal a synchronous receive clock to clock said second synchronous bit data stream to said first synchronous data terminal in a synchronous bit data stream format.

* * * * *